United States Patent [19]

Cerbone

[11] 4,283,603
[45] Aug. 11, 1981

[54] ON-HOOK/OFF-HOOK STATUS CHECK CIRCUIT

[75] Inventor: Ralph L. Cerbone, Indianapolis, Ind.

[73] Assignee: Bell Telephone Laboratories, Incorporated, Murray Hill, N.J.

[21] Appl. No.: 122,431

[22] Filed: Feb. 19, 1980

[51] Int. Cl.³ ............................................. H04M 1/24
[52] U.S. Cl. .......................... 179/18 FA; 179/90 BD; 179/90 B; 179/16 AA
[58] Field of Search ............ 179/18 FA, 18 F, 90 BB, 179/90 B, 16 AA, 16 C, 84 R, 84 A, 18 FH, 99 LC

[56] References Cited

U.S. PATENT DOCUMENTS

| | | | |
|---|---|---|---|
| 3,128,351 | 4/1964 | Hohmann et al. | 179/90 BB |
| 3,422,229 | 1/1969 | Wallace | 179/90 B |
| 3,819,866 | 6/1974 | Hawley | 179/16 AA |
| 3,838,223 | 9/1974 | Lee et al. | 179/18 FA |
| 3,849,605 | 11/1974 | Russell | 179/16 AA |
| 3,899,645 | 8/1975 | Brafman | 179/90 AD |
| 3,914,556 | 10/1975 | Frazee | 179/18 F |
| 4,110,569 | 8/1978 | Schindler et al. | 179/84 A |

OTHER PUBLICATIONS

*IBM Technical Disclosure Bulletin*, "Telephone On/Off Hook Detector", Glowienka and Reiley, vol. 16, No. 5, Oct. 1973, pp. 1558-1559.

*Primary Examiner*—Gerald L. Brigance
*Attorney, Agent, or Firm*—Harry L. Newman

[57] ABSTRACT

An on-hook/off-hook status check circuit is disclosed which is connectable between a telephone subscriber loop and a telephone station set. The circuit, upon activation, provides adjunct telephone station equipment with a predetermined sequence of outputs from two opto-isolator circuits, the sequence identifying the on-hook or off-hook status of the telephone set. The circuit may be used with adjunct station equipment in accordance with station set modularity, loop transmission and signaling, and central office traffic engineering objectives.

7 Claims, 3 Drawing Figures

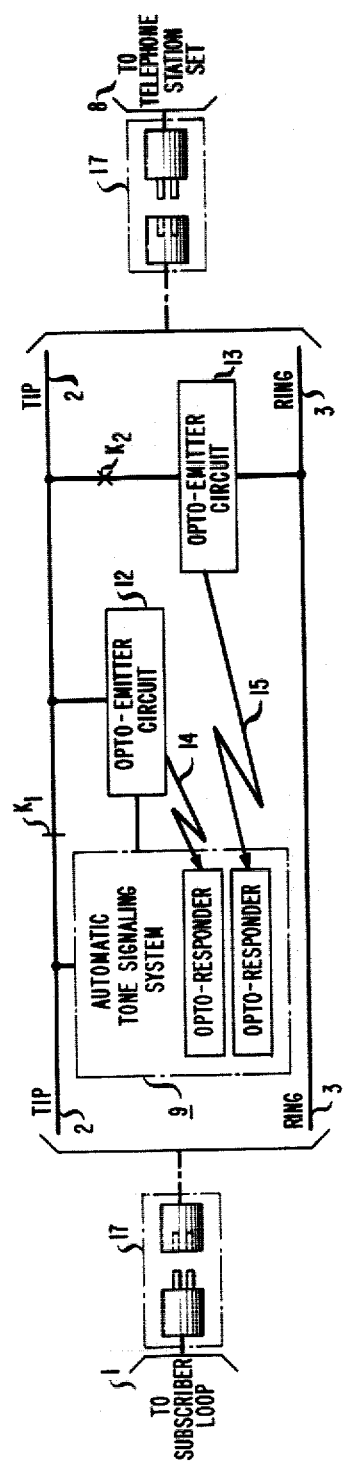

ON-HOOK/OFF-HOOK STATUS CHECK CIRCUIT

Technical Field

This invention relates to the identification of the on-hook or off-hook status of a telephone station set switchhook and, more particularly, to the identification of switchhook status at a location apart from the telephone station set.

BACKGROUND OF THE INVENTION

A common way of providing telephone subscribers with services that are not provided by the basic telephone station set is to incorporate them in an adjunct to the station set. One such adjunct is an automatic dialer. The adjunct dialer, which is typically connected in series between the associated telephone station set and the central office, often includes only the circuitry that is necessary to provide the dialing function. The adjunct dialer relies upon the associated telephone station set to perform the functions of going off-hook and acquiring dial tone from the central office. Thus when properly used, the adjunct dialer should be activated only after the telephone subscriber has removed the handset from the switchhook of the associated telephone station set and has recognized that dial tone has been returned from the central office.

A problem arises from this arrangement when the controls of the adjunct are operated before the handset is removed from the switchhook and dial tone has been returned. A path is completed across the telephone line shorting the line as automatic dialing begins. Thus if the adjunct is activated inadvertently such as may occur when a child plays with the controls of the adjunct, the telephone line is seized, and the central office will respond. No incoming calls may be received, and central office equipment is tied up. The adjunct does not release the path and open the line until the automatic dialing is completed.

One solution to this problem is known, namely to transmit switchhook status information over a separate lead. This lead proceeds from an extra contact of the associated telephone set's switchhook to the adjunct telephone station equipment. Off-hook or on-hook status information is provided over this lead to the adjunct equipment. Accordingly, the adjunct dialer is able to inhibit dialing if its controls are inadvertently operated when the telephone set is on-hook. There are then required in this embodiment three leads: the standard tip lead and ring lead, and an additional switchhook status lead. Hohmann et al., U.S. Pat. No. 3,128,351, which discloses an adjunct repertory dialer, is exemplary of apparatus which employ the additional lead for this purpose.

While this method provides a solution, it is desirable today, with the trend toward telephone station equipment modularity, to employ just two leads, the standard tip and ring leads, between the various items of station apparatus and to employ standard plug and jack arrangements to tie them together. In this manner, efficiencies in telephone equipment inventory control are achieved, and the subscriber is encouraged to install and to modify his telephone equipment arrangement without the aid of telephone company personnel. Exemplary plug and jack arrangements currently in use are described in Hardesty, U.S. Pat. No. 3,860,316, and its progeny and Krumreich et al., U.S. Pat. No. 3,850,497 and its progeny.

While it is desirable to provide a remote switchhook status check function without increasing the number of leads normally provided, it is likewise recognized that, in so doing, it is undesirable to increase the impedance of the telephone subscriber loop. Such an increase limits both the transmission and signaling distances from the central office where a telephone station set may be placed.

SUMMARY OF THE INVENTION

The above-stated problems and related problems are solved with the principles of the present circuit. A predetermined sequence of outputs is derived from a unique combination of two opto-isolators and a single activation means having two switch contacts. The single activation means operates the first switch contact before the second switch contact. The first opto-isolator is placed by the first switch contact in series with the tip or the ring leads and responds to current flowing in the subscriber loop. The second opto-isolator is placed across the tip and ring leads by the second switch contact so as to shunt the telephone set. Thus when the associated telephone station set is on-hook, the second opto-isolator draws loop current causing the first opto-isolator to respond simultaneously. Accordingly, simultaneous activation of the two opto-isolators identifies the on-hook status of the switchhook. Its off-hook status is identified by the sequence of the first opto-isolator responding before the second opto-isolator responds.

The present on-hook/off-hook status check circuit is connected between the telephone station set and the telephone subscriber loop and requires no additional leads between it and its associated telephone station set. This is in accordance with current trends toward telephone station equipment modularity.

The present circuit may be used in combination with many forms of adjunct station equipment such as burglar alarm, energy management, telephone answering, or repertory dialing systems. When used with these systems, central office equipment capacity is saved, and the probability of call completion is increased.

Additionally, the maximum transmission length and signaling range from the telephone switching central office are not limited by the application of the present circuit in either its idle or busy state.

When used with an automatic multi-frequency tone signaling system, the system's multi-frequency tone signaling characteristics are not impaired.

These and other features of the present invention will become apparent from a study of the following description of an embodiment of the invention.

BRIEF DESCRIPTION OF THE DRAWINGS

FIG. 3 is a block diagram of a second embodiment of the on-hook/off-hook status check circuit of FIG. 1 in combination with an automatic tone signaling system.

DETAILED DESCRIPTION

Figure 1:
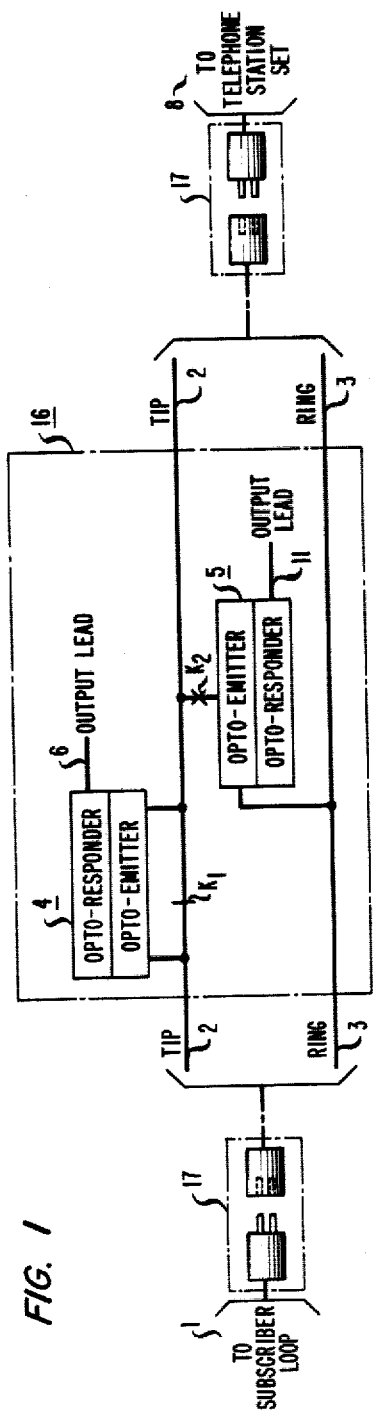
FIG. 1 is a block diagram and schematic drawing of a preferred embodiment of the on-hook/off-hook status check circuit.

Referring to FIG. 1, an on-hook/off-hook status check circuit 16 exemplary of the present invention includes an opto-isolator circuit 4 connected in either the tip lead 2 as shown or in the ring lead 3 of a telephone subscriber loop 1. A second opto-isolator circuit 5 is connected across the tip and ring leads 2 and 3 on the telephone station set side 8 of the circuit as shown.

No additional leads beyond the tip and ring leads 2 and 3 are required to the present circuit to assure its operation. Accordingly standard connector arrangements 17 in accordance with current telephone station set modularity trends may be employed. This and other features are fully described in the following detailed discussion.

Opto-isolator circuits 4 and 5 are of the type which comprise an opto-emitter portion and an opto-responder portion. The opto-emitter portion may take any form of transducer from electric energy to light energy that does not materially interfere with the transmission of electrical energy. Such an element might be a light emitting diode.

The opto-responder portion may take any form of transducer that converts light energy to electrical signals so that output leads 6 and 11 from opto-isolator circuits 4 and 5 provide electrically isolated output signals to associated adjunct telephone station equipment. Also, the opto-responder may be included within the adjunct telephone station equipment such that the predetermined sequence of outputs from the on-hook/off-hook status check circuit 16 may comprise optical instead of electrical output signals.

The on-hook/off-hook status check circuit also includes conditioning means $K_1$ and $K_2$ which may most easily be regarded as two contacts of the same high speed relay. Conditioning means $K_1$ is normally closed so as to allow the unimpaired transmission of information to the telephone station set 8. Conditioning means $K_2$ is maintained normally in an open state so as to not shunt the telephone station set 8 and preclude communication over the subscriber loop 1. Thus, there is no additional transmission loss associated with the application of the present circuit either during the idle state of the telephone station set or when the telephone station set is being used for transmission of information. Pursuant to this objective, the signaling resistance range from the central office is not limited by the application of the subject circuit in its idle state or during signaling.

Only when it is desired to determine the switchhook status of telephone station set 8 are conditioning means $K_1$ and $K_2$ activated. Accordingly, transmission to the telephone set 8 is only interrupted for a brief interval in order to determine the switchhook status. It will be subsequently demonstrated that during this status check interval, the impedances presented to the central office may be chosen so as to not interfere with central office functions.

While the present circuit will be described as connectable by leads 6 and 11 to adjunct repertory dialer equipment of the multi-frequency tone signaling type, it is envisioned that other forms of adjunct telephone station equipment may employ the subject circuit such as automatic telephone answering equipment, energy management systems, telephone fire and burglar alarm systems, and the like.

The operation of the on-hook/off-hook status check circuit is now described in detail. Firstly, the adjunct telephone station equipment with which the present circuit is associated must activate the relay or other such means of activating conditioning means $K_1$ and $K_2$.

The relay or other such means of activating conditioning means $K_1$ and $K_2$ perform this function in the order of opening $K_1$ before closing $K_2$. In this manner it is expected that a predetermined sequence of signals will appear on output leads 6 and 11 from opto-isolators 4 and 5, identifying the switchhook status of the telephone station set 8.

If the telephone station set is on-hook, the battery voltage that is applied to tip and ring leads 2 and 3 at the telephone switching central office usually appears across normally open conditioning means $K_2$. Thus upon the opening of conditioning means $K_1$, the voltage will continue to appear across open conditioning means $K_2$.

It is not until conditioning means $K_2$ is closed that current will flow through the opto-emitter portions of opto-isolators 4 and 5. This current provides electrical output signals to simultaneously appear at output leads 6 and 11 or in the activation order of the second opto-isolator 5 before the first opto-isolator 4. In the case where the opto-responder portions of opto-isolators 4 and 5 form portions of the adjunct telephone station equipment, the circuit provides the same predetermined sequence of optical outputs.

If the telephone station set is off hook, the battery voltage that is applied to tip and ring leads 2 and 3 at the telephone switching central office will cause a current to flow through the telephone station set 8.

Thus when conditioning means $K_1$ opens, current is immediately caused to flow through the opto-emitter portion of opto-isolator circuit 4, which provides an electrical output on lead 6.

Upon the closing of conditioning means $K_2$, shortly thereafter, opto-isolator circuit 5 will shunt current away from the telephone set and provide an output on lead 11.

This sequence of electrical outputs appearing on leads 6 and 11 whereby an output appears on lead 6 before appearing on lead 11 provides adjunct telephone station equipment with information identifying the off-hook condition of the telephone station set 8. A predetermined sequence of outputs simultaneously appearing at leads 6 and 11 or upon lead 11 before lead 6 has already been shown to identify the on-hook status of the telephone station set 8 to the adjunct telephone equipment.

Immediately after performing the switchhook status check function, the adjunct telephone station equipment returns conditioning means $K_1$ and $K_2$ to their normal states.

It is believed apparent that in current technology, the on-hook/off-hook decision may require a sequence of signals only lasting a fraction of a second. In other words, transmission to the telephone station set will be only interrupted for the length of time that is required for the activation means to operate conditioning means $K_1$ and $K_2$ and to restore them to their normal states.

Also, it is believed apparent that the sum of the impedances of the opto-emitter circuit portions of opto-isolator circuits 4 and 5 may be made to equal the desired impedance of the off-hook telephone station set 8. In this manner, the central office, private branch exchange, or key equipment will not be alarmed by the appearance of an unexpected impedance.

Furthermore, during the period of time in which the status check is performed, the resulting transients have been found to not exceed three milliseconds. This period is too short to be recognized by central office, private branch exchange, or key equipment. In fact, most central office, private branch exchange, and key equipment systems are intentionally designed to ignore transients or "hits" of such short duration.

In light of the above, it is clear that the present circuit does not cause additional transmission loss, effect the maximum signaling range from the central office, or interfere with central office functions.

Figure 2:
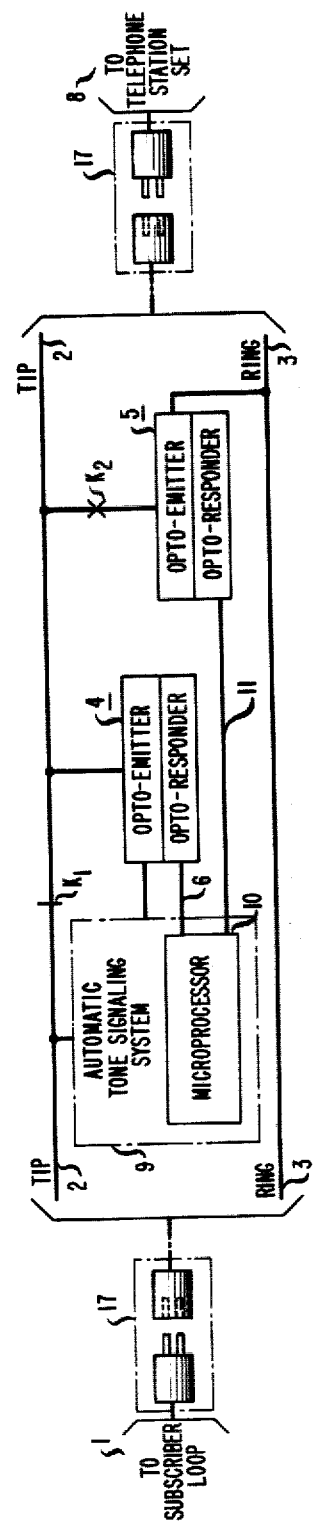
FIG. 2 is a block diagram and schematic drawing of the embodiment of FIG. 1 in combination with an automatic tone signaling system including a microprocessor.

FIG. 2 is a block diagram and schematic drawing of the on-hook/off-hook status check circuit in combination with an adjunct automatic tone signaling system including a microprocessor 10. Such a system may be employed with the subject circuit to provide the following functions: to record and store frequently dialed telephone numbers, to provide a means for updating the list of stored numbers, and to provide an automatic tone signaling system for automatically dialing a desired number upon the push of a single button associated with the number.

If one of the buttons of the automatic dialing system is intentionally pushed and the telephone station set is properly off-hook, the conditioning means $K_1$ remains open, and $K_2$ remains closed for the duration of dialing.

In this manner, the transmitter of telephone station set 8 is effectively shunted from the circuit. This is desirable so that tones accidentally introduced into the transmitter will not effectuate any distortion of the tones generated by the automatic tone signaling system.

Also, it is desirable to make the sum of the impedances of the automatic tone signaling system 9, opto-isolator circuit 4 and opto-isolator circuit 5 equal to the off-hook impedance of the telephone station set 8. In this manner, the combined circuit appears to a telephone switching central office as an off-hook telephone station set during the automatic dialing mode.

If one of the buttons of the automatic dialing system is inadvertently operated, the on-hook status check circuit may provide information to the microprocessor 10 so that automatic dialing may be immediately aborted if the associated telephone station set 8 is on-hook. In this manner, the recognition period is so brief that no dial tone is drawn from the central office, saving supervisory capacity of the central office equipment.

Also, one trying to reach telephone station set 8 will have a greater probability of reaching that station since conditioning means $K_1$ recloses and $K_2$ reopens immediately upon identifying that a user has inadvertently activated the system 9. It necessarily follows that if there is a higher probability of call completion, there will be a resulting efficiency in the use of call-carrying capacity of the central office equipment.

FIG. 3 is a block diagram and schematic drawing of a second embodiment of the on-hook/off-hook status check circuit 16 of FIG. 1 in combination with an automatic tone signaling system 9. It is assumed in FIG. 3 that the opto-responder portions of opto-isolator circuits 4 and 5 may be included as previously discussed within the circuitry of an automatic tone signaling system 9. It follows that the opto-responder portions may similarly comprise a portion of a burglar alarm, energy management, or telephone answering system.

In FIG. 3, then, opto-emitters 12 and 13 provide the adjunct system 9 with optical outputs 14 and 15 rather than electrical output signals over leads 6 and 11.

I claim:

1. An on-hook/off-hook status check circuit, adapted to be connected between the tip and ring leads of a telephone subscriber loop and the telephone station set characterized in that the circuit provides a predetermined sequence of outputs identifying the switchhook status of the telephone station set, the circuit comprising a first means connectable in series with the telephone subscriber loop for providing a first output responsive to the flow of current a second means connectable across the telephone subscriber loop for providing a second output responsive to the flow of current and means for sequentially activating the first means before the second means such that upon activation of the first and second means, a sequence of the first output before the second output identifies the off-hook status of the telephone station set and a sequence of the second output before the first output or simultaneously with the first output identifies the on-hook status of the telephone station set.

2. An on-hook/off-hook status check circuit, adapted to be connected between the tip and ring leads of a telephone subscriber loop and the telephone station set characterized in that the circuit provides a predetermined sequence of outputs identifying the switchhook status of the telephone station set, the circuit comprising a first opto-emitting means connectable in series with the telephone subscriber loop for providing a first output responsive to the flow of current a second opto-emitting means connectable across the telephone subscriber loop for providing a second output responsive to the flow of current and means for sequentially activating the first opto-emitting means before the second opto-emitting means such that upon activation of the first and second opto-emitting means, a sequence of the first output before the second output identifies the off-hook status of the telephone station set and a sequence of the second output before the first output or simultaneously with the first output identifies the on-hook status of the telephone station set.

3. A circuit for determining the on-hook or off-hook status of a telephone station set switchhook characterized in that the circuit is adapted to be connected between the tip and ring leads of a telephone subscriber loop and the telephone station set and provides a predetermined sequence of outputs identifying the status of the telephone station set comprising, a first opto-isolator circuit connectable in series with the telephone subscriber loop, the first opto-isolator for providing a first output responsive to the flow of loop current, a second opto-isolator circuit connectable across the telephone subscriber loop, the second opto-isolator circuit for providing a second output responsive to the flow of loop current, and activation means for sequentially activating the first opto-isolator circuit before the second opto-isolator circuit such that, upon activation, a sequence of the first output before the second output identifies the off-hook status of the telephone station set and a sequence of the second output before the first output or simultaneously with the first output identifies the on-hook status of the telephone station set.

4. A circuit as presented in claim 3 in combination with an automatic tone signaling system connectable between the tip and ring leads of the telephone subscriber loop and the telephone station set, the automatic tone signaling system for requesting a switchhook status check and for aborting automatic signaling upon receiving the predetermined sequence of outputs identifying the on-hook status of the telephone station set switchhook or for continuing automatic signaling upon receiving the predetermined sequence of outputs identifying the off-hook status of the telephone station set switchhook.

5. An automatic tone signaling system connectable between the tip and ring leads of a telephone subscriber loop and a telephone station set
characterized in that
the system aborts automatic dialing depending upon the sequence of receipt of a first and a second optical output comprising,
a first opto-emitter circuit connectable in series with the telephone subscriber loop for sensing a flow of loop current, after being conditioned therefor, and, consequently, for providing an optical output,
a second opto-emitter circuit connectable in parallel with the telephone station set for sensing the flow of loop current, being conditioned therefor after the conditioning of the first opto-emitter circuit, and, consequently, for providing an optical output, and
a microprocessor for causing the abortion of automatic dialing depending upon the sequence in which the optical outputs are received.

6. A method for determining the on-hook/off-hook status of a telephone station set
characterized in that
the determination is made depending upon the sequence of receipt of optical outputs provided by two opto-emitter circuits, which comprises
sensing the flow of current through the telephone station set utilizing a first opto-emitter circuit conditioned therefor and connected in series with the set, the first opto-emitter circuit providing a first optical output upon sensing the telephone set current,
sensing the flow of current along the telephone subscriber loop utilizing a second opto-emitter circuit, conditioned therefor after the conditioning of the first opto-emitter circuit, the second opto-emitter circuit providing a second optical output upon sensing the loop current,
determining the sequence of receipt of the first and second optical outputs and, thereby, the on-hook/off-hook status of the telephone set utilizing processor circuitry and
providing a predetermined output depending upon the sequence in which the first and second optical outputs are received.

7. A circuit for sensing the on-hook or off-hook status of a telephone station set, connectable between the tip and ring leads of a telephone subscriber loop and the telephone station set
characterized in that
the circuit provides a predetermined sequence of electrically isolated outputs identifying the status of the telephone station set, comprising
a first subcircuit comprising a first opto-isolator circuit connectable in series with the telephone subscriber loop for providing an electrically isolated first output responsive to the flow of loop current and a normally closed first contact of a contact activation means, the first contact being in parallel with the first opto-isolator circuit and
a second subcircuit comprising a second opto-isolator circuit connectable across the subscriber loop for providing an electrically isolated second output responsive to the flow of loop current and a normally open second contact of the contact activation means, the second contact connected in series with the opto-isolator circuit and adapted to be closed after the first contact is opened such that
upon the operation of the contact activation means, a sequence of the first output before the second output identifies the off-hook status of the telephone set and
a sequence of the second output before the first output or simultaneously with the first output identifies the on-hook status of the telephone set.

* * * * *